United States Patent
Suemoto et al.

(10) Patent No.: US 7,274,401 B2
(45) Date of Patent: Sep. 25, 2007

(54) DIGITAL CAMERA FOR FAST START UP

(75) Inventors: Kazunori Suemoto, Niiza (JP);
Masashi Inoue, Asaka (JP); Masaaki Orimoto, Asaka (JP)

(73) Assignee: Fujifilm Corporation, Tokyo (JP)

( * ) Notice: Subject to any disclaimer, the term of this patent is extended or adjusted under 35 U.S.C. 154(b) by 740 days.

(21) Appl. No.: 09/768,253

(22) Filed: Jan. 25, 2001

(65) Prior Publication Data
US 2001/0009443 A1 Jul. 26, 2001

(30) Foreign Application Priority Data
Jan. 25, 2000 (JP) ............................. 2000-016322

(51) Int. Cl.
*H04N 5/225* (2006.01)
*G02B 13/16* (2006.01)

(52) U.S. Cl. .................................................. 348/335

(58) Field of Classification Search ................ 348/335, 348/340, 347, 351, 357, 345, 207.99, 372; 346/79, 83, 85, 130, 133; 359/676, 697, 359/823, 824, 699
See application file for complete search history.

(56) References Cited

U.S. PATENT DOCUMENTS

| | | | | |
|---|---|---|---|---|
| 4,464,037 A * | 8/1984 | Terui et al. | .................. | 396/130 |
| 4,841,324 A * | 6/1989 | Ogasawara | .................... | 396/91 |
| 5,424,776 A * | 6/1995 | Hirasawa | .................... | 348/345 |
| 5,752,106 A * | 5/1998 | Yamano | .................... | 396/263 |
| 6,266,083 B1 * | 7/2001 | Sakaegi et al. | ......... | 348/207.99 |
| 6,839,086 B1 * | 1/2005 | Katagiri | .................... | 348/347 |

* cited by examiner

*Primary Examiner*—Vivek Srivastava
*Assistant Examiner*—Justin P Misleh
(74) *Attorney, Agent, or Firm*—Birch, Stewart, Kolasch & Birch, LLP

(57) ABSTRACT

The present invention provides a digital camera in which the start-up time which is from when a power source is turned on until the digital camera is in a state in which photographing is possible is short. A DC motor and a stepping motor are driven simultaneously. A cord plate which is provided in advance at an outer circumferential surface of a rotating cylinder is detected. Then, the stepping motor is driven to move the focus lens by a movement amount corresponding to a detected range of the cord plate. When the setting of various types of components necessary for photographing other than the lens groups has finished, even if the zoom lens groups (forward lens group and backward lens group) are moving to their home positions, the digital camera is in a state in which photographing is possible.

40 Claims, 12 Drawing Sheets

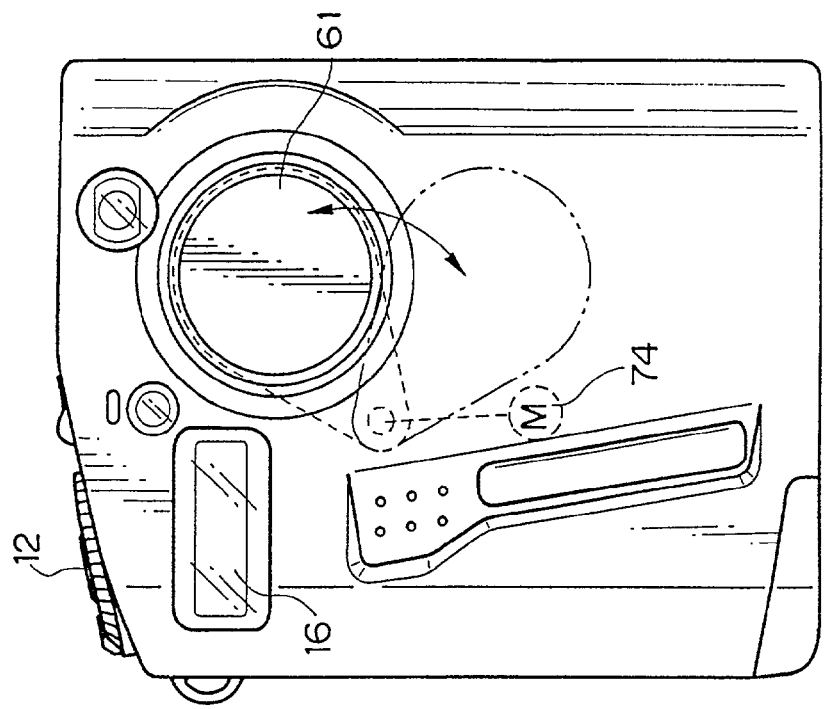
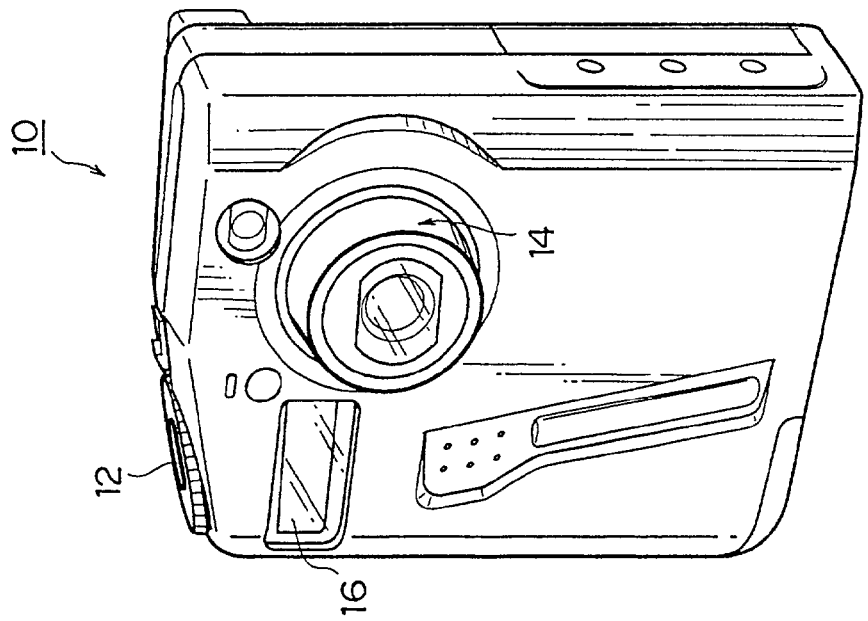

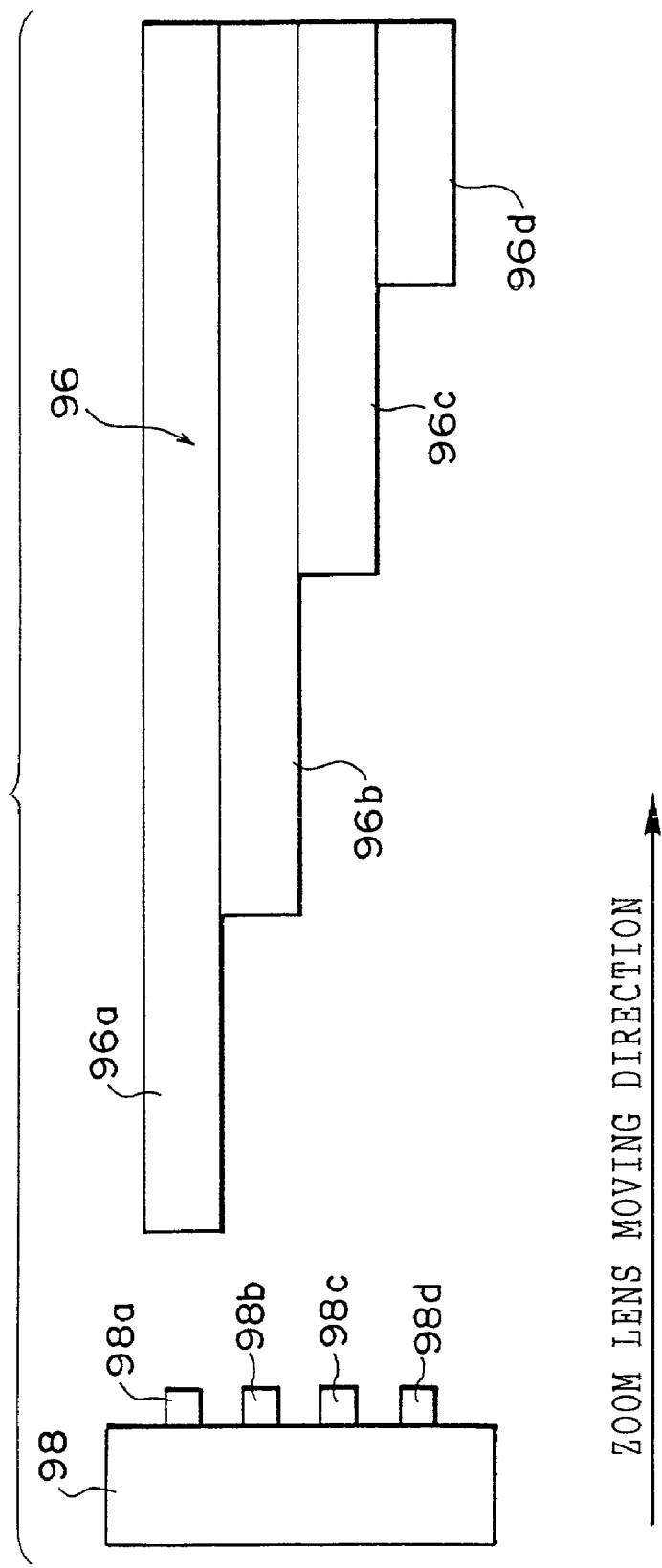

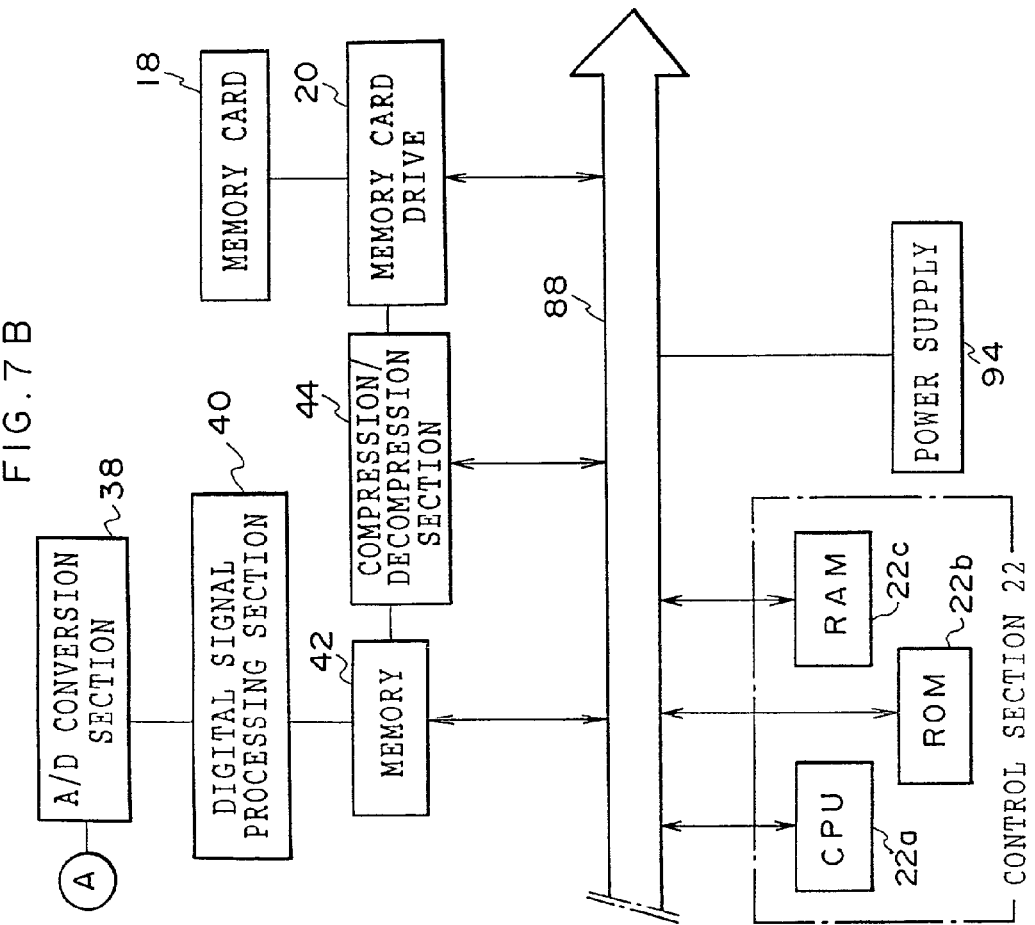

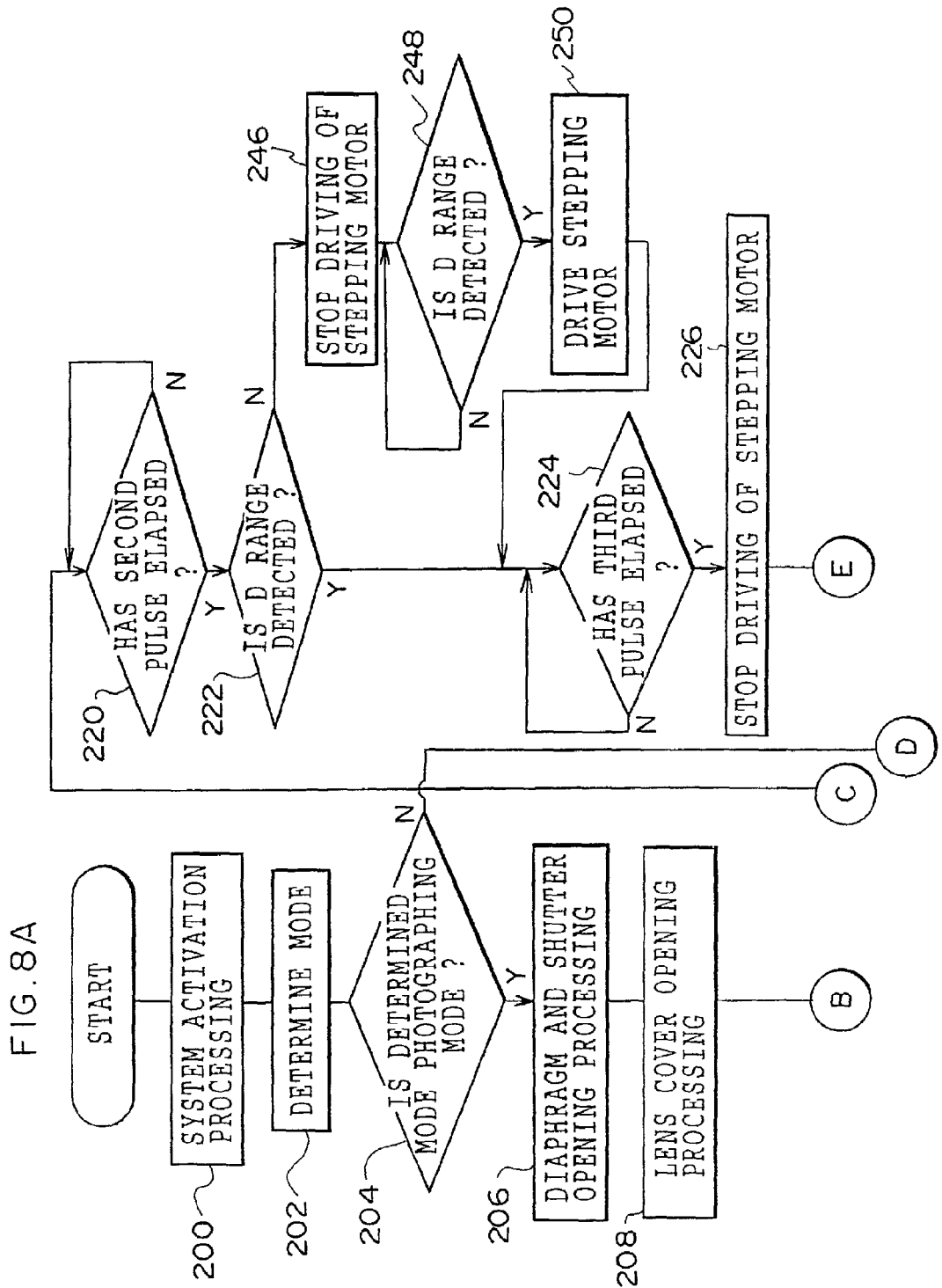

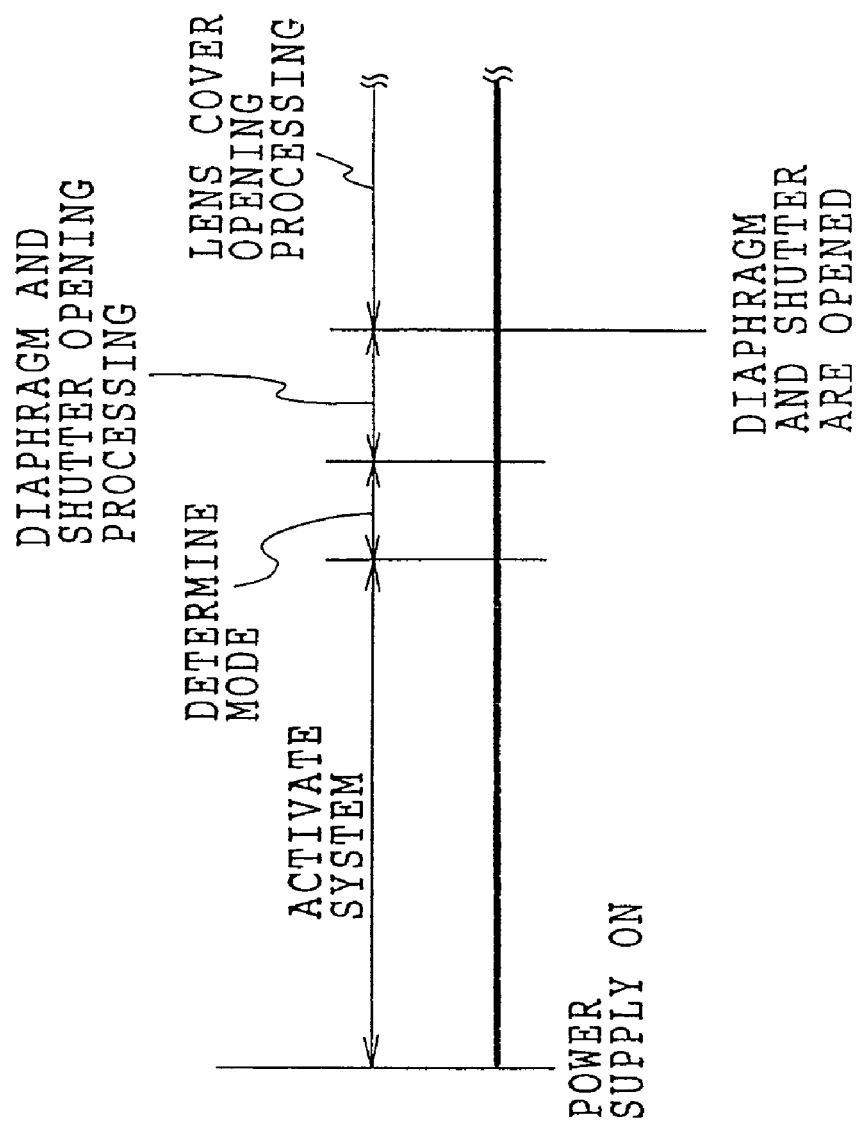

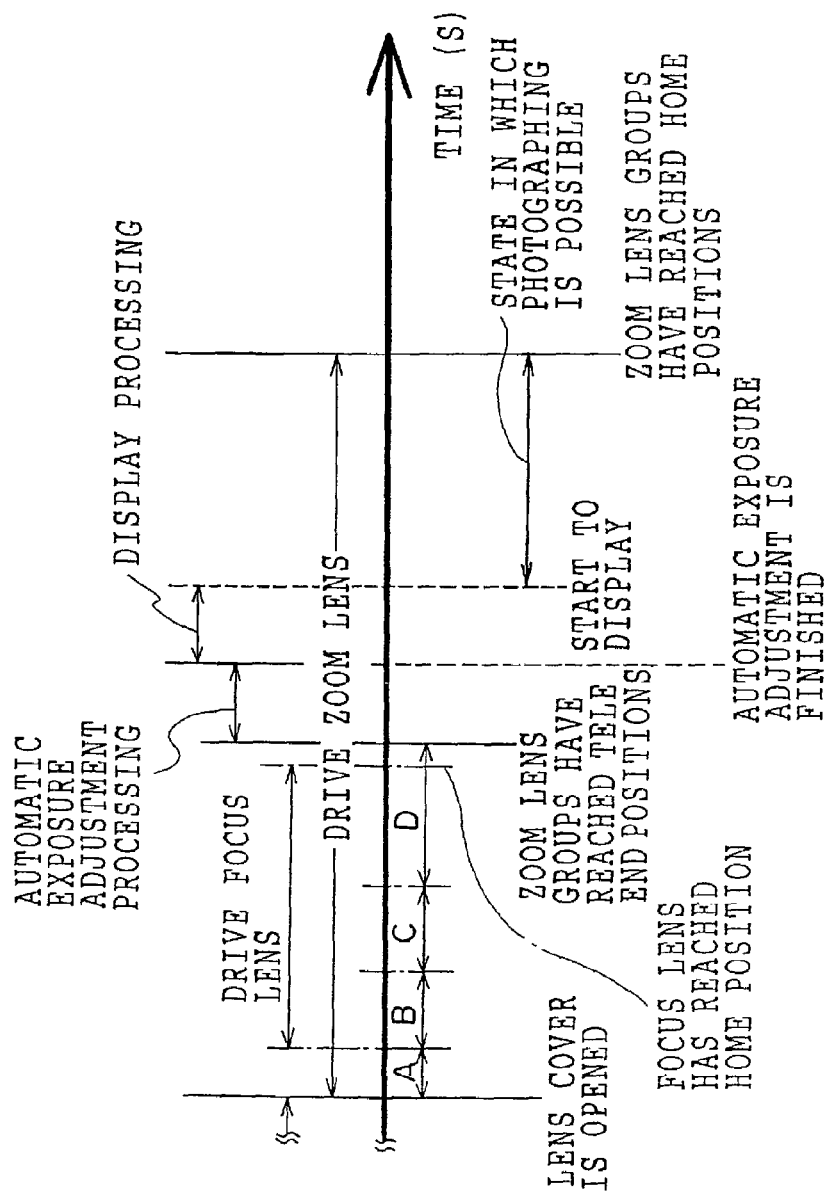

DIGITAL CAMERA FOR FAST START UP

BACKGROUND OF THE INVENTION

1. Field of the Invention

The present invention relates to a digital camera and, in particular, to a digital camera with a zoom lens group, a method for activating the digital camera and a method for changing a mode from a stand-by mode to a mode in which photographing is possible.

2. Description of the Related Art

In general, a digital camera with a zoom lens accommodates a zoom lens group and a focus lens group within a lens barrel which is retracted within a housing of the digital camera. When a power source is turned on, the lens barrel is extended to a predetermined reference position to set the zoom lens group so as to be near to a wide position. The focus lens group is moved to a position corresponding to the zoom lens group within a space formed within the housing caused by extension of the lens barrel. In this way, the digital camera is in a stand-by state in which photographing is possible.

Recently, there has been demand for a digital camera in which the time from when a power source is turned on to open a lens cover until the time when the digital camera is in a state in which photographing is possible (which time will be referred to as the start-up time hereinafter) is short.

In order to shorten the start-up time, it is effective to reduce processings necessary for initialization of digital camera to as few as possible. However, there is a limit in reduction of the processings necessary for initialization of digital camera. A problem exists in that it is difficult to provide a digital camera with shorter start-up time.

SUMMARY OF THE INVENTION

In view of the aforementioned, an object of the present invention is to provide a digital camera in which the start-up time can be shortened.

In order to accomplish the above-described object, in accordance with a first aspect of the present invention, there is provided a digital camera comprising: (a) a housing provided with a plurality of lens groups movable along an optical axis in accordance with an instructed magnification; (b) an image sensor disposed for receiving light through the lens groups and producing an electronic information in accordance therewith; (c) a memory connected to the image sensor for receiving and storing data in accordance with the electronic information received from the image sensor; and (d) a controller electronically controlling the memory and movement of the lens groups, the controller having program logic defining a plurality of operation modes, the logic upon initiation determining an operation mode, and if the mode is determined to be an image recording mode, the logic causing the controller to commence moving the lens groups to initialization positions and performs initialization processing for enabling image recording, and after completion of the initialization processing for enabling image processing, if a command is received for image recording before the lens groups have arrived at the initialization positions, controls the memory to store data in accordance with the electronic information presently available from the image sensor.

In accordance with the first aspect of the present invention, when the initialization of the devices necessary for photographing other than the lens groups is finished, the controller enables the digital camera to be in a state in which photographing is possible regardless of positions of the lens groups. In other words, even if the lens groups are moving to the initialization positions, the devices necessary for photographing fetch an image focused by the moving lens groups and photograph the image. Thus start-up time which is from when a power source is turned on until a digital camera is in a state in which photographing is possible can be reduced. As a result, photographing can be carried out without missing a photographing opportunity.

In accordance with a second aspect of the present invention, the program logic causes the controller to initialize the image sensor and memory for image recording.

That is, in accordance with the second aspect of the present invention, when the initialization of the photographing device and the image storing device which are the minimum devices necessary for photographing is finished, the digital camera is in a state in which photographing is possible. Therefore, a number of devices necessary for photographing is small and the time necessary for the initialization of the digital camera can be made shorter.

In accordance with a third aspect of the present invention, the devices necessary for photographing preferably further include a display device for displaying an image recorded by the photographing device. In this case, when an image to be photographed is displayed on the display device, then the digital camera is in a state in which photographing is possible. Therefore, an image to be photographed can be easily caught and this is preferable.

In accordance with a fourth aspect of the present invention, in the digital camera described in one of the first aspect to the third aspect of the present invention, the lens groups comprise a zoom lens group which moves in accordance with an instructed magnification and a focus lens group for focusing, the controller controlling the focus lens group to follow movement of the zoom lens during the movement of the zoom lens group to an initialization position.

By moving the focus lens group as described above, the zoom lens group and the focus lens group can be disposed at the initialization positions more rapidly than in a case in which the zoom lens group is moved to the initialization position and then the focus lens group is moved to the initialization position.

During the initialization of the zoom lens group after the initialization of the devices necessary for photographing is finished, the focus lens group is disposed at a focusing position or near the focusing position thus the time from when a shutter button is pressed until focusing is carried out becomes short and image recording can be immediately carried out.

In accordance with a fifth aspect of the present invention, the digital camera according to the fourth aspect of the present invention further comprises a detector for detecting a movement amount of the zoom lens group. The controller determines the movement amount of the focus lens group in accordance with a movement amount detected by the detector. The movement amount of the zoom lens group can be detected correctly, therefore the focus lens group can be moved correctly to a position corresponding to the movement amount of zoom lens group.

In accordance with a sixth aspect of the present invention, a memory is further included for dividing a range of the zoom lens group, which range is from a retracted position to an initialization position, into a plurality of steps and storing movement amounts of focus lens group corresponding to respective steps. Preferably, the controller reads, from the memory, a movement amount of focus lens group corresponding to a step detected by the detector to move the focus lens group.

In accordance with a seventh aspect of the present invention, a method for activating a digital camera having a plurality of lens groups which move in accordance with an instructed magnification, and an image sensing system disposed for receiving an image from the lens groups and producing an electronic information representing the image, the method comprising: (a) determining an operation mode upon power initiation; and (b) if the operation mode is an image recording mode, then: (i) initializing the image sensing system for receiving an image from the lens groups and producing the electronic information representing the image; (ii) moving the lens groups to initialization positions; and (iii) if a command is received to record an image prior to the lens groups arriving at the initialization positions, and after completion of initializing the image sensing system, recording an electronic information representing an image, presently available from the image sensing system.

In accordance with an eighth aspect of the present invention, a method for use in a digital camera having a plurality of lens groups movable in accordance with an instructed magnification, and an image sensing system disposed for receiving an image from the lens groups and producing an electronic information representing the image, the method comprising: (a) determining if an operation mode has changed; and (b) if the operation mode is an image recording mode, then: (i) initializing the image sensing system for receiving an image from the lens groups and producing the electronic information representing the image; (ii) moving the lens groups to initialization positions; and (iii) if a command is received to record an image prior to the lens groups arriving at the initialization positions, and after completion of initializing the image sensing system, recording an electronic information representing an image, presently available from the image sensing system.

Because the seventh aspect and the eighth aspect of the present invention have the same effect as that of the first aspect, detailed descriptions thereof will be omitted.

BRIEF DESCRIPTION OF THE DRAWINGS

FIG. 1A is a perspective view of an exterior of a digital camera to which an embodiment of the present invention is applied.

FIG. 1B is a front view showing the exterior of the digital camera to which an embodiment of the present invention is applied in a state in which a lens is accommodated when a power source is turned off.

FIG. 6 is an explanatory view showing a cord plate provided at an outer circumferential surface of a rotating cylinder and one structural example of a unit for detecting the cord plate.

FIGS. 7A and 7B are block diagrams of a digital camera relating to a present embodiment.

FIGS. 8A and 8B are flowcharts showing control at a time of start-up.

FIGS. 9A and 9B are graphs for explaining a flow of control at a time of start-up.

DESCRIPTION OF THE PREFERRED EMBODIMENTS

Figure 2:
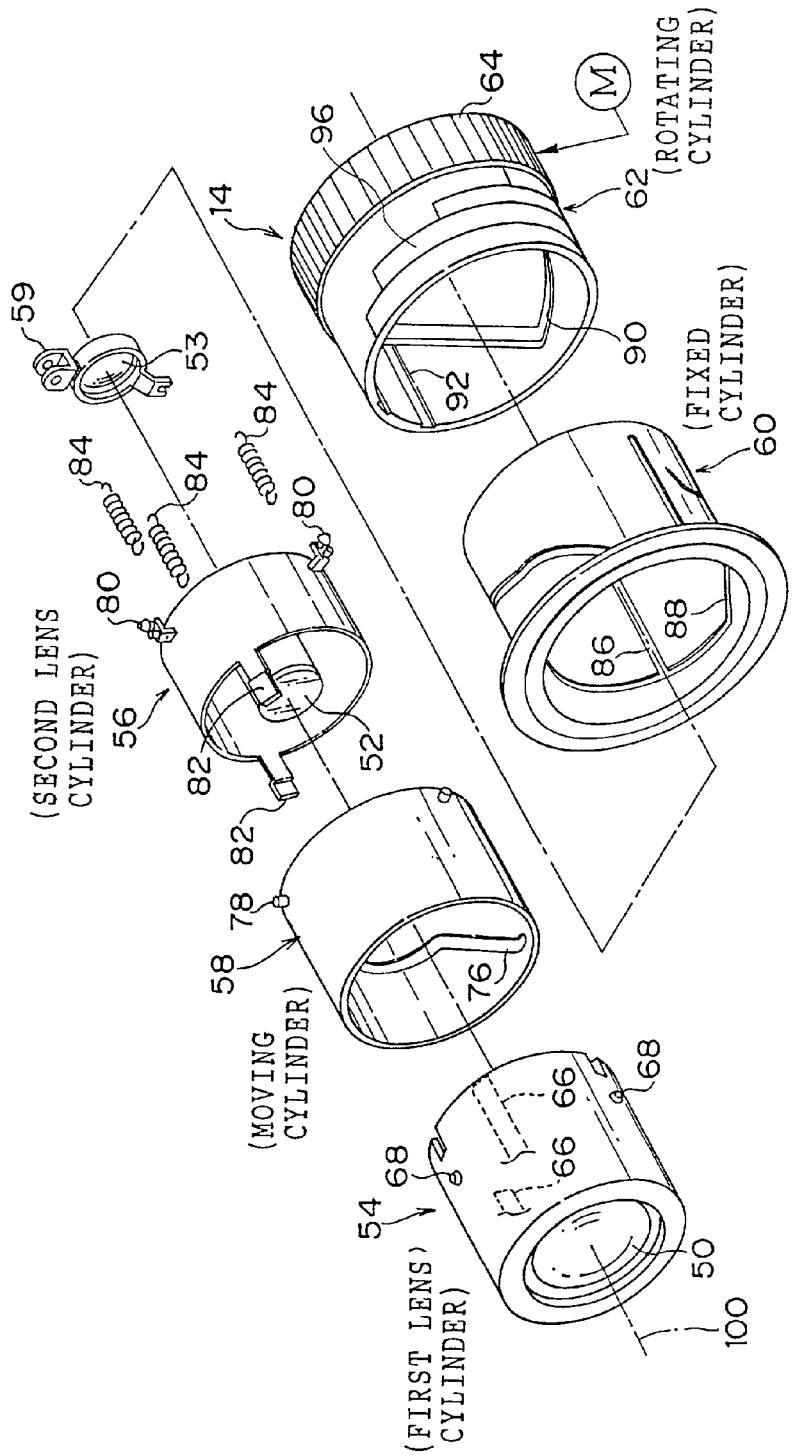
FIG. 2 is an exploded perspective view of lenses of the digital camera shown in FIGS. 1A and 1B.

Hereinafter, a first embodiment of the present invention will be described in detail with reference to the drawings. A digital camera 10 to which the present invention is applied comprises, as shown in FIGS. 1A and 1B, a photographing device 30 (see FIGS. 3 through 5) including a shutter button 12, a zoom lens 14 (details thereof will be described later) and a CCD and the like, a flash 16, a memory card drive 20 (see FIG. 7B) and a control section 22 which controls the driving of these components (see FIG. 7B) and the like.

The zoom lens 14 is formed by, as shown in FIGS. 2 through 5, a forward lens group 50, a backward lens group 52 a focus lens 53, a first lens cylinder 54, a moving cylinder 58, a second lens cylinder 56, a fixed cylinder 60 and a rotating cylinder 62.

A gear portion 64 is formed at an outer circumferential surface of the rotating cylinder 62 at a camera main body side thereof. The driving force of a DC motor 70 (see FIGS. 3 through 5) which is a zoom motor is transmitted to the gear portion 64, thereby causing the rotating cylinder 62 to rotate while contacting the outer circumferential surface of the fixed cylinder 60.

A cord plate 96 shown in FIG. 6 is provided at an outer circumferential surface of the rotating cylinder 62 at the camera main body side thereof so as to be parallel to the gear portion 64. The cord plate 96 is provided so as to divide an angle range where the rotating cylinder 62 can rotate and which corresponds to positions of the forward lens group 50 and the backward lens group 52 into a predetermined number of ranges. For example, in the present embodiment, the cord plate 96 is provided, which divides the angle range where the rotating cylinder 62 can rotate into four ranges. The four ranges include A range which is a first rotation angle range (for example a range of 0.degree. to 4.5.degree.), B range which is a second rotation angle range (for example a range of 4.5.degree. to 12.1.degree.), C range which is a third rotation angle range (for example a range of 12.1.degree. to 25.degree.) and D range which is a fourth rotation angle range (for example a range of 25.degree. to 56.degree.).

These ranges are detected by a terminal 98 which is shown in FIG. 6 and is provided at the camera main body. The terminal 98 has four contacts 98a, 98b, 98c and 98d at positions corresponding to four ranges of the cord plate 96 (i.e., A range 96a, B range 96b, C range 96c and D range 96d). The contacts 98a, 98b, 98c and 98d contact corresponding ranges A, B, C and D of the cord plate 96 so as to detect the range of the cord plate 96 and the detected results are outputted to the control section 22 to be described later.

A second lens cam unit 90 and a straight advancing guide groove 92 for a moving cylinder are formed at an inner circumferential surface of the rotating cylinder 62. The second lens cam unit 90 moves the second lens cylinder 56 to be described later in a direction of optical axis 100. The straight advancing guide groove 92 for a moving cylinder applies rotational drive of the rotating cylinder 62 to the moving cylinder 58 to be described later and allows forward and backward movements of the moving cylinder 58 along the optical axis 100.

A straight advancing guide opening 86 for second lens which guides the second lens cylinder 56 so that it can go straight in a direction of optical axis 100 and a moving cylinder cam 88 which moves the moving cylinder 58 in the direction of optical axis 100 are formed at an inner circumferential surface of the fixed cylinder 60.

The second lens cylinder 56 has the backward lens group 52 and the focus lens 53 therein. The backward lens 52 is held by a second lens frame 57 provided within the second lens cylinder 56 (see FIGS. 3 through 5).

The second lens frame 57 is provided with a stepping motor 72 which is a focus motor. Driving of the stepping motor 72 is transmitted via a feed screw 65 to a focus lens frame 59 (see FIGS. 3 through 5).

The focus lens frame 59 is movable along the optical axis by a guide pin 63 and the feed screw 65 which are provided at the second lens frame 57. The focus lens frame 59 moves in the direction of optical axis 100 in accordance with a lead of the feed screw 65 which rotates in accordance with a drive amount of the stepping motor 72. The focus lens frame 59 moves between an original position which is nearest to an imaging surface side with respect to the second lens cylinder 56 and a position which is apart from the original position toward a subject side. Driving of the stepping motor 72 will be described later.

A plurality of second lens cam follower units 80 and a plurality of straight advancing guide protrusions 82 are provided at the outer circumferential surface of the second lens cylinder 56. The second lens cam follower units 80 engage with the second lens cam unit 90 provided at the rotating cylinder 62 and the straight advancing guide opening 86 for second lens provided at the fixed cylinder 60. The straight advancing guide protrusions 82 engage with straight advancing guide grooves 66 of the first lens cylinder 54 to be described later. Accordingly, due to rotation of the rotating cylinder 62, the second lens cylinder 56 moves straight in the direction of optical axis 100 with respect to the fixed cylinder 60.

A plurality of springs 84 are provided between the second lens cylinder 56 and the fixed cylinder 60 (see FIG. 2). The second lens cylinder 56 is continuously urged to the imaging surface side of a photographing device by the springs 84.

The moving cylinder 58 is provided with a first lens cam 76 and a plurality of moving cylinder cam followers 78. The first lens cam 76 engages with first lens cam followers 68 which will be described later. The moving cylinder cam followers 78 engage with the moving cylinder cam 88 of the above-described fixed cylinder 60 and the straight advancing guide groove 92 of the above-described rotating cylinder 62.

The first lens cylinder 54 holds the forward lens group 50 therein by a lens holding frame which is provided within an opening end of the first lens cylinder 54. A plurality of straight advancing guide grooves 66 are formed at an inner circumferential surface of the first lens cylinder 54. A plurality of first lens cam followers 68 are provided at an outer circumferential surface of the first lens cylinder 54. The straight advancing guide grooves 66 engage with the above-described straight advancing guide protrusions 82 of the second lens cylinder 56. The first lens cam followers 68 engage with the first lens cam 76.

That is, the moving cylinder 58 moves along the optical axis 100 in accordance with rotation of the above-described rotating cylinder 62. In accordance with the movement of the moving cylinder 58, the straight advancing guide protrusions 82 of the second lens cylinder 56 move within the straight advancing guide grooves 66. At the same time, the first lens cam 76 of the moving cylinder 58 acts such that the first lens cylinder 54 moves straight along the optical axis 100 with respect to the moving cylinder 58.

The first lens cam followers 68, the moving cylinder cam followers 78, the second lens cam follower units 80, the straight advancing guide opening 86 for second lens, the straight advancing guide grooves 92 for moving cylinder and the springs 84 are respectively provided at positions which divide a circumference of a circle about the optical axis 100 into three areas.

Figure 3:
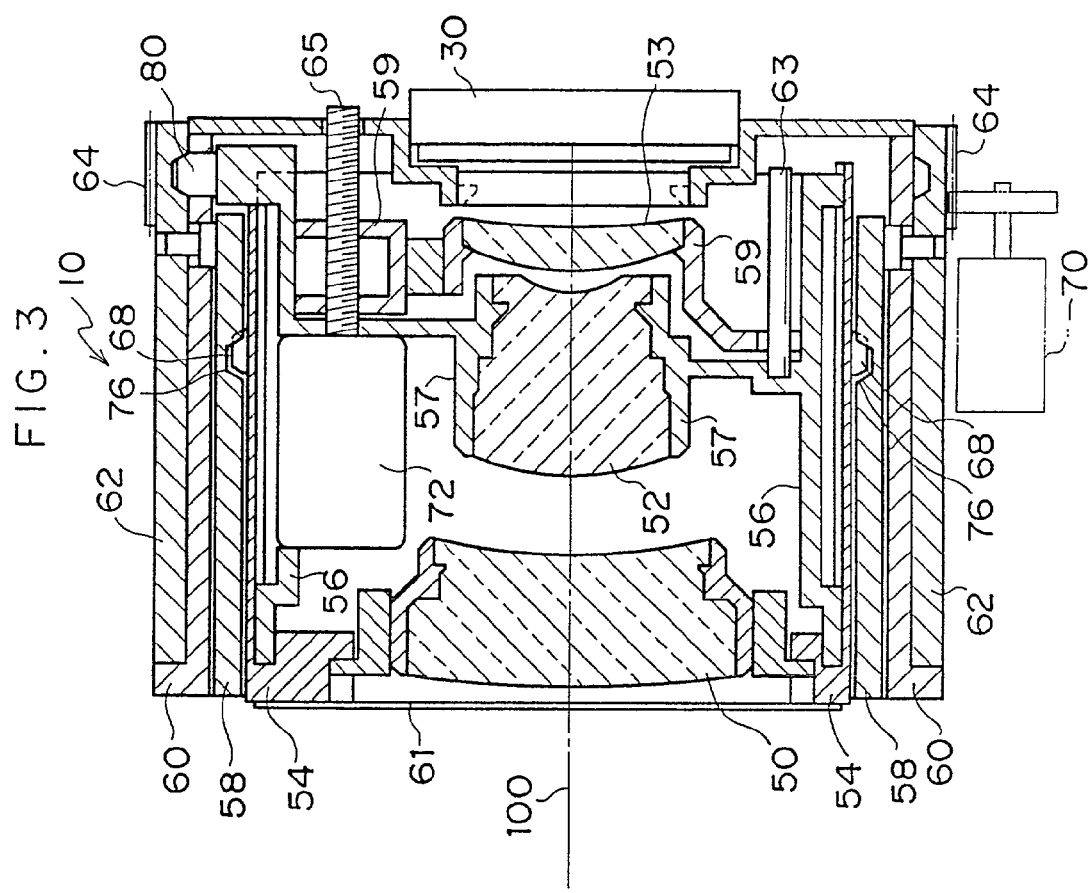
FIG. 3 is a cross-sectional view showing retraction positions of the lenses in the digital camera shown in FIGS. 1A and 1B.

When a power source 94 (FIG. 7B) is turned off, as shown in FIG. 3, the first lens cylinder 54, the moving cylinder 58, the second lens cylinder 56, the fixed cylinder 60 and the rotating cylinder 62 are retracted within a housing of the digital camera 10. The forward lens group 50, the backward lens group 52 and the focus lens 53 are accommodated within the retracted cylinders so as to be close with each other. A front surface of the forward lens group 50 is covered with a lens cover 61 which can open/close (see FIG. 1B).

Figure 7A:
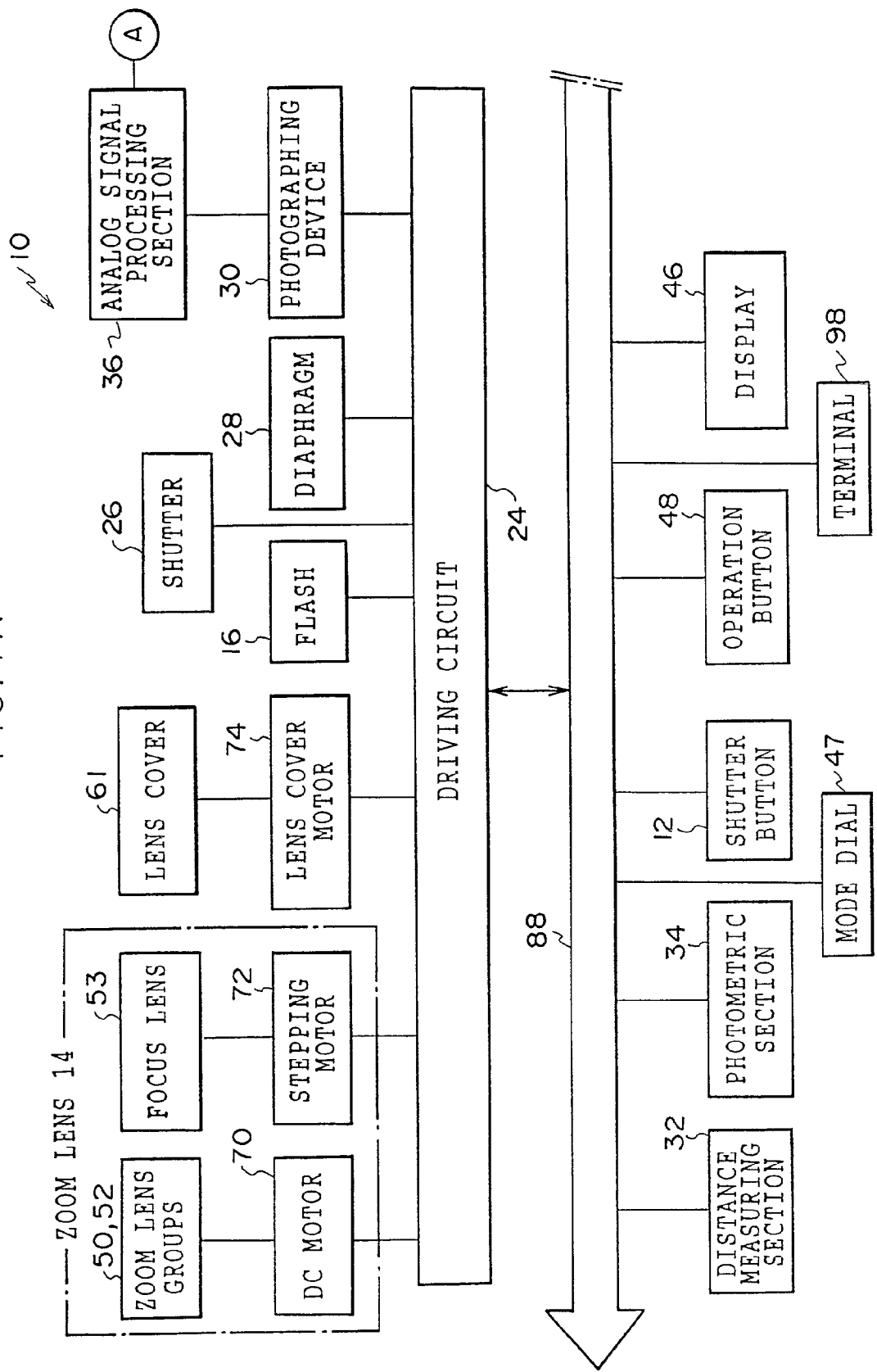

The lens cover 61 is opened or closed by a lens cover motor 74 (FIG. 7A). Driving of the lens cover motor 74 is controlled by a control section 22. That is, the lens cover motor 74 is controlled by the control section 22 such that the lens cover 61 is opened when the power source 94 is turned on. Moreover, the lens cover motor 74 is driven by the control section 22 such that when the power source 94 is turned off, the zoom lens 14 is accommodated within the digital camera 10 so as to be retracted therein and then the lens cover 61 is closed.

In a retracted state of the zoom lens 14 before a power source is turned on, as shown in FIG. 3, the forward lens group 50, the backward lens group 52 and the focus lens 53 are close to each other and disposed at respective accommodation positions which are nearest to an imaging surface side of the photographing device 30.

Figure 4:
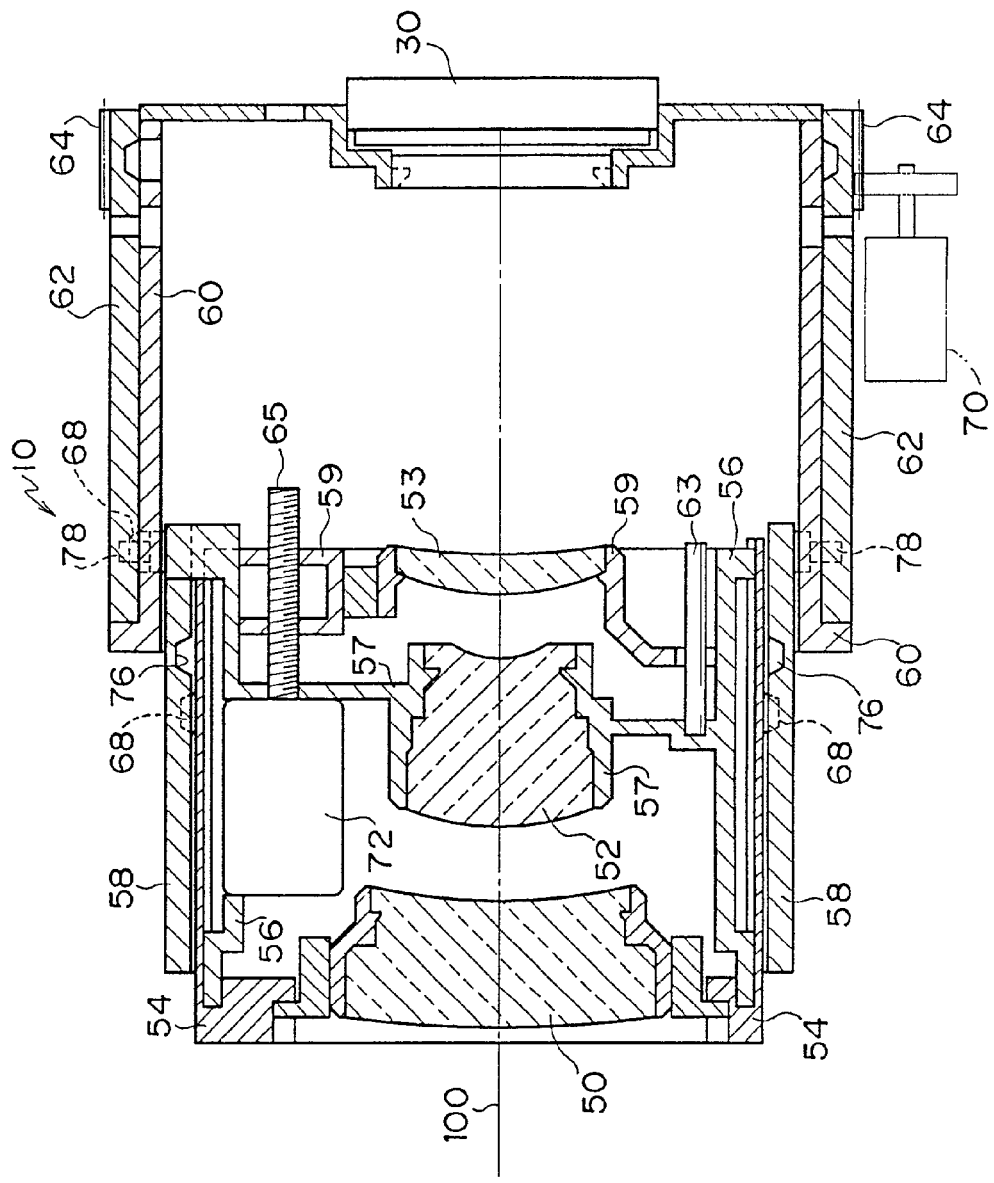
FIG. 4 is a cross-sectional view showing tele positions of the lenses in the digital camera shown in FIGS. 1A and 1B.

When the power source 94 is turned on, the rotating cylinder 62 rotates in an accommodation rotation range from an initial position to an intermediate position so as to move the zoom lens 14 from the retracted position shown in FIG. 3 to a tele (far off) position shown in FIG. 4. Further, the rotating cylinder 62 rotates in a magnification-changing rotation range from the intermediate position to an end position so as to move the zoom lens 14 from the tele position to a wide position shown in FIG. 5. The zoom lens groups 50 and 52 and the focus lens 53 are moved to predetermined initialization positions.

As shown in FIG. 7B, the control section 22 is formed of a CPU 22a, a ROM 22b and a RAM 22c. Connected via a bus 88 to the control section 22 are a shutter button 12, a memory card drive 20, a driving circuit 24, a distance measuring section 32, a photometric section 34, a memory 42, a compression/decompression section 44, a display 46, an operation button 48 and a terminal 98.

Programs for controlling the above-mentioned various types of components connected to the control section 22, the DC motor 70 and the stepping motor 72 are stored in the RAM 22b. The programs will be described later. Various types of data necessary for respective programs inputted via the bus 88 are stored in the RAM 22c.

Connected to the driving circuit 24 which is connected via the bus 88 to the control section 22 are the flash 16, the shutter 26, the diaphragm 28, the photographing device 30, the DC motor 70, the stepping motor 72 and the lens cover motor 74. The photographing device 30 includes, for example, a photographing element such as a CCD or the like.

If the power source 94 is turned on, the CPU 22a reads a program from the ROM 22b to carry out an initialization processing on various types of components. Further, the CPU 22a carries out a start-up processing in which the DC motor 70 and the stepping motor 72 are driven from the ROM 22b to move the zoom lens group 50 and the focus lens 53 to their initialization positions. Then, the CPU 22*a* controls various types of components to be on stand-by for photographing.

For example, in the stand-by state for photographing, the CPU 22*a* determines an automatic focusing (AF) control value on the basis of a distance to a subject measured in the distance measuring section 32 to output the resultant value to the driving circuit 24. Then, the driving circuit 24 drives the stepping motor 72 on the basis of the AF control value to move the focus lens 53. In this way, focus adjustment is automatically carried out.

Further, the CPU 22*a* drives the DC motor 70 in accordance with a selected magnification and moves the forward lens group 50 and the backward lens group 52 to respective positions corresponding to the selected magnification.

At the photometric section 34, the CPU 22*a* determines exposure control values such as a diaphragm value (an amount of opening of diaphragm), a shutter speed, whether or not light is emitted by the flash 16 and the like to output results to the driving circuit 24. If the shutter button 12 is pressed downward, the driving circuit 24 drives the shutter 26, the diaphragm 28, the flash 16 and the photographing device 30 on the basis of the exposure control values such that a subject image transmitted through the forward lens group 50, the backward lens group 52 and the focus lens 53 is photographed.

Electric charges corresponding to an amount of light entered in accordance with the exposure control value are accumulated in the photographing device 30. Accumulated electric charges, i.e., an image signal is outputted to an analog signal processing section 36.

The analog signal processing section 36 carries out a predetermined analog signal processing (for example, a noise reduction processing) on the inputted image signal to output the resultant signal to an A/D conversion section 38. In the A/D conversion section 38, the inputted analog signal is converted into a digital signal and the resultant digital signal is outputted to a digital signal processing section 40. The digital signal processing section 40 carries out a predetermined digital signal processing (for example, a shading correction processing) on the inputted digital signal to output image data to the memory 42. An image of the image data outputted to the memory 42 is displayed on the display 46.

In the digital camera 10, an image photographed by carrying out a predetermined operation with the operation button 48 can be stored in a memory card 18. In this case, image data stored in the memory 42 is outputted to the compression/decompression section 44. In the compression/decompression section 44, a predetermined image compression processing (for example, a JPEG compression processing) is carried out. The compressed image data is outputted to the memory card drive 20 and then written in the memory card 18.

In the digital camera 10, the compressed image data stored in the memory card 18 can also be read out. In this case, the compressed image data read from the memory card 18 is outputted to the compression/decompression section 44 and is subjected to decompression processing in the compression/decompression section 44. In this way, the compressed image is converted into an original image. The decompressed image is displayed on the display 46.

The digital camera 10 can not only photograph an image at a predetermined point of time but also continuously display an image of a subject which is being photographed like a video camera (which will be referred to as a movie mode hereinafter).

A determination as to whether or not a photographed image can be visually confirmed is carried out by, for example, determining whether or not a light amount measured in the photometric section 34 is at least a predetermined value. Also, whether or not an amount of electric charges accumulated in the CCD of the photographing device 30 is at least a predetermined value can be determined.

Basically, respective components of the digital camera 10 are operated by electricity being supplied thereto from a main power source which is not shown (for example, an NiMH battery or an alkaline battery). If the main power source is turned off, electricity is supplied by a sub power source (for example, a lithium battery) so as to suppress the consumption of power from the main power source.

A description will now be given of a start-up processing carried out by the CPU 22*a* on the basis of a program which is read out from the ROM 22*b*, with reference to flowcharts of FIGS. 8A and 8B and explanatory views of FIGS. 9A and 9B. FIGS. 9A and 9B are graphs showing a correspondence between a processing carried out after the power source 94 of a digital camera is turned on and elapsed time.

Figure 8B:
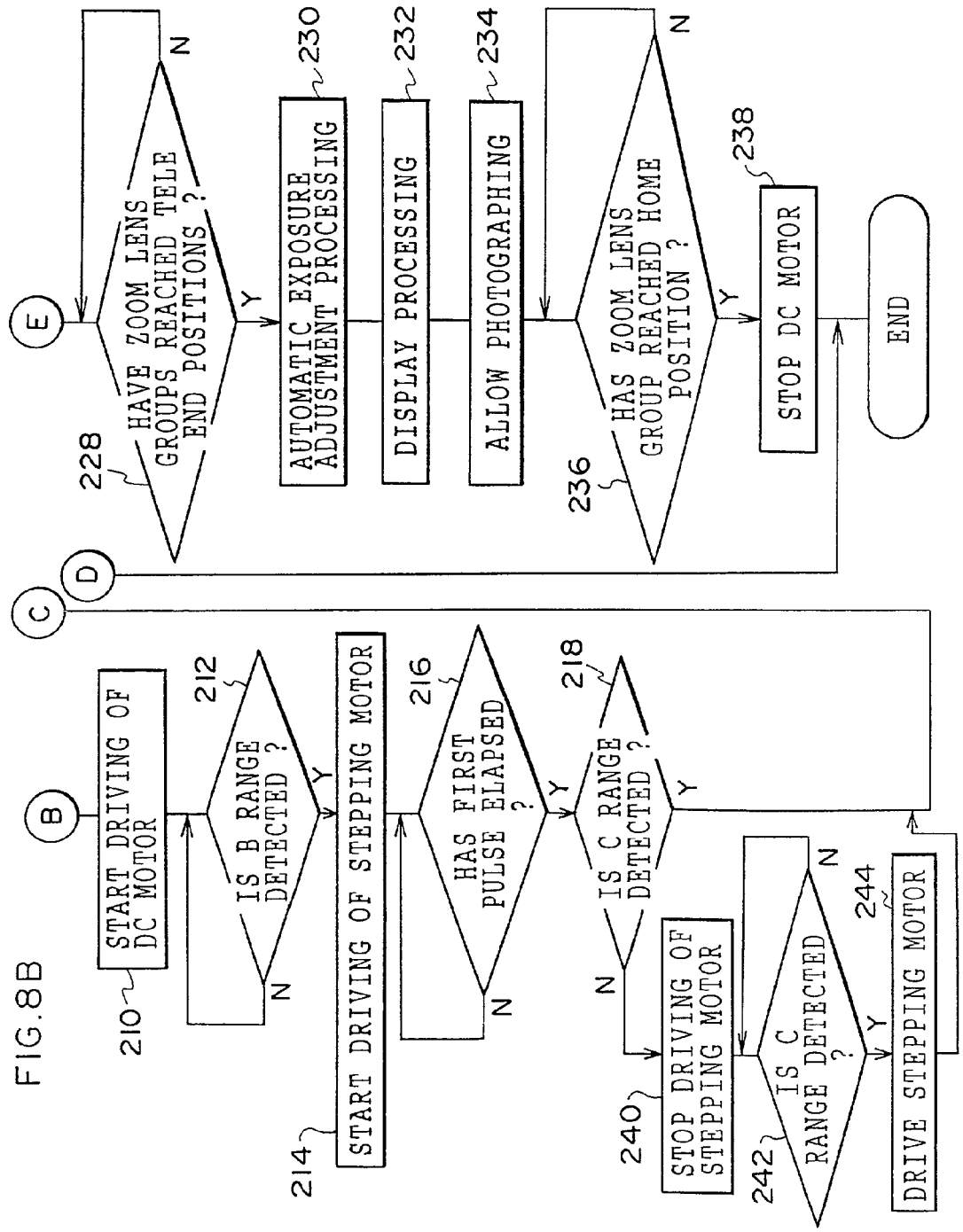

In step 200 in FIGS. 8A and 8B, the CPU 22*a* carries out a system activation processing on the basis of the read-out program so as to activate control systems of respective sections in the digital camera 10. In step 202, on the basis of a position of a mode dial 47, a mode of the digital camera is determined from an automatic photographing mode, a manual photographing mode, a self-timer photographing mode, a play mode, a PC mode in which the digital camera is connected to a personal computer to output an image and a setup mode for setting initial conditions of various types of functions. In step 204, a determination is made as to whether or not the determined mode is the photographing mode (any one of the automatic photographing mode, the manual photographing mode and the self-timer photographing mode).

In step 204, if it is determined that the determined mode is not the photographing mode, the present routine ends and initialization processings corresponding to various types of modes are carried out. If the determined mode is the photographing mode, the process proceeds to next step 206. In step 206, a diaphragm is set automatically or manually, and a shutter is opened. In step 208, the lens cover motor formed by, for example, the DC motor is driven to open the lens cover.

In step 210, the driving of the DC motor 70 is started so as to rotate the rotating cylinder 62 such that the lens barrel begins to be extended. At the same time, the zoom lens groups 50 and 52 begin to be moved to their initialization positions. At this time, the cord plate 96 provided at the outer circumferential surface of the rotating cylinder 62 is detected by the terminal 98. In step 212, a determination is made as to whether a range of the cord plate detected by the terminal 98 is the B range 96*b*.

If the range of the cord plate is the B range 96*b*, in step 214, the driving of the stepping motor 72 is started so that the focus lens 53 begin to move. In step 216, a determination is made as to whether the stepping motor 72 is driven at a first number of pulses (for example 58 pulses). If the stepping motor 72 is driven at the first number of pulses, the process proceeds to step 218.

In step 218, a determination is made as to whether the range of the cord plate detected by the terminal 98 is the C range. If the range of the cord plate is the C range, the process proceeds to step 220. If the range of the cord plate is not the C range, the process proceeds to step 240. In step

240, driving of the stepping motor stops. In step 242, a determination is made as to whether the range of the cord plate detected by the terminal is the C range. If the range of the cord plate is the C range, in step 244 the stepping motor 72 is driven again and the process proceeds to step 220.

In step 220, a determination is made as to whether the stepping motor 72 is driven at a second number of pulses (for example 158 pulses). If the stepping motor 72 is driven at the second number of pulses, the process proceeds to step 222. In step 222, a determination is made as to whether the range of the cord plate detected by the terminal is the D range. If the detected range of the cord plate is the D range, the process proceeds to step 224. If the detected range of the cord plate is not the D range, the process proceeds to step 246 and driving of the stepping motor stops. Then, in step 248, a determination is made as to whether the range of the cord plate detected by the terminal is the D range. If the cord plate detected by the terminal is the D range, the stepping motor 72 is driven again in step 250 and the process proceeds to step 224.

In step 224, a determination is made as to whether the stepping motor 72 is driven at a third number of pulses (for example 327 pulses). If the stepping motor 72 is driven at the third number of pulses, the process proceeds to step 226 and driving of the stepping motor 72 stops. Then, the process proceeds to step 228.

In step 228, a determination is made as to whether the rotating cylinder 62 rotates from the initial position to the intermediate position due to the driving of the DC motor 70 such that the zoom lens groups 50 and 52 have reached tele end positions. Further, a determination is made as to whether the zoom lens 14 is moved from the retracted position shown in FIG. 3 to the tele position shown in FIG. 4.

If the zoom lens groups 50 and 52 have reached the tele end positions and the zoom lens 14 has moved to the tele position, the process proceeds to step 230. In step 230, an automatic exposure adjustment processing is carried out on the basis of a photometric value from the photometric section 34.

After the automatic exposure adjustment processing, the process proceeds to step 232. In step 232, a processing is carried out so as to display an image which is focused by the zoom lens groups 50 and 52 and the focus lens 53 on the display 46.

When the image is displayed on the display 46, in step 234 photographing is allowed. Then, it is set such that a photographing processing can be carried out as an interrupt hereafter. As the photographing processing is well known, a description thereof will be omitted.

Figure 5:
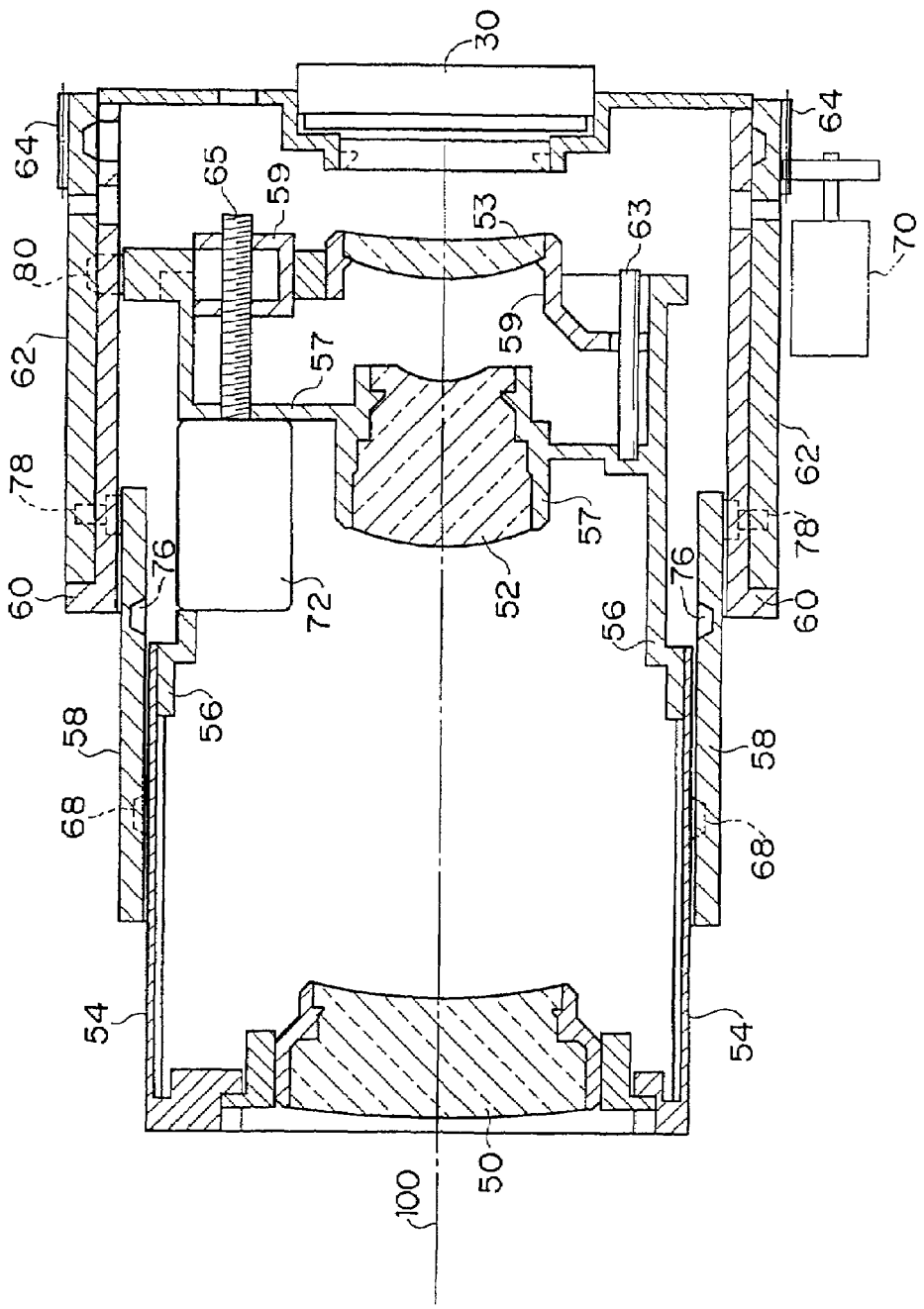
FIG. 5 is a cross-sectional view showing wide positions of the lenses in the digital camera shown in FIGS. 1A and 1B.

In step 236, a determination is made as to whether the rotating cylinder 62 rotates in the magnification-changing range from the intermediate position to the end position such that the zoom lens groups 50 and 52 have reached at their home positions and the zoom lens 14 has moved from the tele position shown in FIG. 4 to the wide position shown in FIG. 5.

If the zoom lens groups 50 and 52 have reached at their home positions and the zoom lens 14 has moved to the wide position, in step 238 the DC motor 70 stops, and the present routine ends.

As described above, in the digital camera of the present embodiment, even if the zoom lens groups 50 and 52 are being moved to their home positions, when setting of respective sections necessary for photographing other than the lens groups has finished, the digital camera is in a state in which photographing is possible. Thus the start-up time, which is the time from when the power source 94 is turned on to open the lens cover until the time the digital camera is in a state in which photographing is possible, can be reduced.

In the present embodiment, when an image which is imaged by the lens groups which are moving is displayed on the display 46, the digital camera is determined to be in a state in which photographing is possible. It is possible for the structure to be such that even if the image is not displayed on the display 46, the digital camera can be in a state in which photographing is possible.

Further, in the digital camera of the present embodiment, at a time of start-up processing, the stepping motor 72 is driven by a predetermined drive amount together with movements of the zoom lens groups 50 and 52 so as to move the focus lens 53. Thus it is possible to reduce the time when the zoom lens groups 50 and 52 and the focus lens 53 have reached their home positions, and the zoom lens 14 is in an initialization state.

In the present embodiment, driving of the stepping motor 72 is controlled on the basis of the cord plate 96 provided at the outer circumferential surface of the rotating cylinder 62. The present invention is not limited to this structure. For example, it is possible to drive the stepping motor 72, during the movement of the DC motor 70, every fixed period of time which is determined in advance or every predetermined fixed clock.

In the present embodiment, a description has been given of a case in which after the focus lens has been moved, when the initialization of devices necessary for photographing other than the lens groups such as a photographing device, an image storage device and the like is completed, the digital camera is in a state in which photographing is possible, but the present invention is not limited to this case. Even if the movement of the focus lens is not complete, when the initialization of the devices necessary for photographing other than the lens groups is complete, the digital camera may be in a state in which photographing is possible. As the focus lens moves in accordance with the movement amount of the zoom lens to carry out focusing, even if both the focus lens and the zoom lens are moving to initialization positions or either the focus lens or the zoom lens is moving to the initialization position, it is possible to appropriately obtain an image focused by the moving lens groups. Thus the start-up time which is from when the power source is turned on to open the lens cover until the digital camera is in a state in which photographing is possible, can be reduced. As a result, photographing can be carried out without missing a photographing opportunity.

In the present embodiment, a description has been given of a case in which the power source 94 is switched on from off, but the present invention is not limited to this case. The present invention can be applied to a case in which a mode is changed from a stand-by mode in which a digital camera is in a waiting state in which the power source 94 is on, to a mode in which photographing is possible.

In the present embodiment, an image to be photographed is displayed on a display, and then photographing is allowed. It is possible to allow photographing before displaying the image on the display. In this case, the structure is preferably such that a user is notified by an LED or the like when photographing is allowed.

The digital camera 10 is structured such that either an AA battery such as an NiMH battery, an alkaline battery or the like or a DC power source is selected as a main power source. The battery to be used is not limited to the NiMH battery or the alkaline battery. Although the AA battery is used as the alkaline battery, batteries other than the AA battery can be used.

In the above-described embodiment, a zoom lens consisting of two groups is used, but the present invention is not limited to this zoom lens and the zoom lens may include three groups or more. The present invention can be applied not only to a zoom lens camera but also to a two-focus camera in which switching between a tele position, a wide position and a retracted position is carried out. Further, although the tele position is set between the retracted position and the wide position, the wide position can be set between the retracted position and the tele position.

In the above-described embodiment, a description has been given of the digital camera 10 which is provided with the lens cover 61 which is opened or closed by a driving means such as the lens cover motor 74 or the like. The present invention can also be applied to a digital camera which is not provided with a lens cover which is opened or closed by the driving means.

As described above, in the digital camera according to the first aspect to the third aspect of the present invention, it is possible to obtain an effect in which the start-up time which is from when a power source is turned on to open a lens cover until the digital camera is in a state in which photographing is possible can be shortened. Further, an effect in which photographing can be carried out without missing an opportunity for taking a photograph can also be obtained.

In the digital camera according to the fourth aspect of the present invention, in addition to the effect of the first aspect, it is possible to obtain an effect in which the time until the lens groups have reached initialization positions can be shortened.

In the digital camera according to the fifth and sixth aspects of the present invention, an effect in which the focus lens group can be moved correctly to a position corresponding to a movement amount of the zoom lens group can be obtained.

What is claimed is:

1. A digital camera comprising:
    (a) a housing provided with a plurality of lens groups movable along an optical axis in accordance with an instructed magnification;
    (b) an image sensor disposed for receiving light through the lens groups and producing an electronic information in accordance therewith;
    (c) a non-volatile memory connected to the image sensor for receiving and storing data in accordance with the electronic information received from the image sensor; and
    (d) a controller electronically controlling the non-volatile memory and movement of the lens groups, the controller having program logic defining a plurality of operation modes, the logic upon power initiation determining an operation mode, and if the mode is determined to be an image recording mode, the logic causing the controller to commence moving the lens groups to initialization positions and perform initialization processing for enabling image recording, and after completion of the initialization processing for enabling image processing, upon receipt of a command for photographing generated by a shutter being pressed during a movement of the lens group to the initialization positions, control the non-volatile memory to store data in accordance with the electronic information presently available from the image sensor prior to the lens group have completed the movement to the initialization positions.

2. The digital camera according to claim 1, wherein the program logic causes the controller to initialize the image sensor and the non-volatile memory for image recording.

3. The digital camera according to claim 2, further comprising a display device controlled by the controller, the program logic upon initialization, initializing the display device for displaying information.

4. The digital camera according to claim 3, wherein the display device is a display or an LED.

5. The digital camera according to claim 1, wherein the lens groups comprise a zoom lens group which moves in accordance with an instructed magnification and a focus lens group for focusing, the controller controlling the focus lens group to follow movement of the zoom lens group to an initialization position.

6. The digital camera according to claim 5, further comprising a detector in electronic communication with the controller, the detector detecting a movement amount of the zoom lens group, and the controller controlling movement of the focus lens group in accordance with the movement amount detected by said detector.

7. The digital camera according to claim 6, wherein the detector is formed by a cord plate and a terminal.

8. The digital camera according to claim 6, wherein the detector detects step movement, each step corresponding to a movement range of the zoom lens group from a retracted position to the initialization position divided into a substantially equal number of intervals, with step movement information being provided to the controller for movement of the focus lens group in accordance therewith.

9. The digital camera of claim 1, wherein the receipt of the command for image recording occurs when a shutter button of the digital image camera is fully depressed to start a photographing operation.

10. A method for activating a digital camera having a plurality of lens groups which move in accordance with an instructed magnification, and an image sensing system disposed for receiving an image from the lens groups and producing an electronic information representing the image, the method comprising:
    (a) determining an operation mode upon power initiation; and
    (b) if the operation mode is an image recording mode, then:
        (i) initializing the image sensing system for receiving the image from the lens groups and producing the electronic information representing the image;
        (ii) moving the lens groups to initialization positions; and
        (iii) after completion of initializing the image sensing system, upon receipt of a command for photographing generated by a shutter being pressed during the movements of the lens groups to the initialization positions, producing the electronic information representing the image presently available from the image sensing system prior to the lens groups having completed their movements to the initialization positions for recording the electronic information representing the image into a non-volatile memory.

11. The method of claim 10, wherein recording the electronic information representing the image includes displaying the image in accordance with the electronic information on a display device.

12. The method of claim 10, wherein the lens groups comprise a zoom lens group which moves in accordance with the instructed magnification and a focus lens group for focusing, wherein moving the lens groups to the initialization positions include moving the focus lens group to follow movement of the zoom lens group during the movement of the zoom lens group to the initialization position.

13. The method of claim 12, wherein moving the focus lens group to follow the movement of the zoom lens group includes detecting a movement amount of the zoom lens group using a detector.

14. The method of claim 13, wherein detecting the movement amount includes:
   dividing a range of the zoom lens group into a plurality of steps, said range being from a retracted position to the initialization position, and storing movement amounts of the focus lens group corresponding to respective steps; and
   reading the movement amounts of the focus lens group corresponding to the step detected by the detector and moving the focus lens group.

15. The method of claim 10, wherein the receipt of the command for image recording occurs when a shutter button of the digital image camera is fully depressed to start a photographing operation.

16. A method for use in a digital camera having a plurality of lens groups movable in accordance with an instructed magnification, and an image sensing system disposed for receiving an image from the lens groups and producing an electronic information representing the image, the method comprising:
   (a) determining if an operation mode has changed; and
   (b) if the operation mode has changed to an image recording mode, then:
      (i) initializing the image sensing system for receiving the image from the lens groups and producing the electronic information representing the image;
      (ii) moving the lens groups to initialization positions; and
      (iii) after completion of initializing the image sensing system, upon receipt of a command for photographing generated by a shutter being pressed during the movements of the lens groups to the initialization positions, producing the electronic information representing the image presently available from the image sensing system prior to the lens groups having completed their movements to the initialization positions for recording the electronic information representing the image into a non-volatile memory.

17. The method of claim 16, wherein initializing the image sensing system includes initializing the non-volatile memory for storing data in accordance with the electronic information from the image sensing system.

18. The method of claim 17, wherein the camera includes a display device, and wherein recording electronic information representing the image includes enabling display of the image in accordance with the electronic information from the image sensing system.

19. The method of claim 16, wherein the lens groups include a zoom lens group which moves in accordance with the instructed magnification and a focus lens group
   which moves to follow the movement of the zoom lens group during the movement of the zoom lens group to the initialization positions.

20. The method of claim 19, wherein moving the focus lens group to follow movement of the zoom lens group includes detecting a movement amount of the zoom lens group using a detector.

21. The method of claim 20 wherein detecting the movement amount of the zoom lens group includes:
   dividing a range of said zoom lens group into a plurality of steps, said range being from a retracted position to the initialization position, and storing movement amounts of the focus lens group corresponding to respective steps; and
   reading the movement amounts of the focus lens group corresponding to the step detected by the detector and moving the focus lens group.

22. The method of claim 16, wherein the receipt of the command for image recording occurs when a shutter button of the digital image camera is fully depressed to start a photographing operation.

23. A camera, comprising:
   a plurality of lens groups;
   an image sensor for sensing an image from light received through the plurality of lens groups; and
   a controller for controlling movements of the plurality of lens groups, for controlling the image sensor, and for controlling a storage of the image data into a non-volatile memory accessible by the camera,
   wherein when the controller receives instructions for photographing generated by a shutter being pressed during a movement of the plurality of lens groups from a first predetermined position to a second predetermined lens position, the controller controls the image sensor to sense the image prior to the plurality of lens groups have completed their movements to the second predetermined lens position for recording the image data into the non-volatile memory.

24. The camera of claim 23, wherein the first predetermined position of the plurality of lens groups is one of a tele position and a wide position and the second predetermined position of the plurality of lens groups is the other of the tele position and the wide position.

25. The camera of claim 23, wherein the controller controls the plurality of lens groups such that the image is focused during the movement between the first and second predetermined positions.

26. The camera of claim 23, further comprising a display, wherein the image is displayed on the display during the movement between the first and second predetermined positions.

27. The camera of claim 23, wherein the plurality of lens groups include:
   a zoom lens; and
   a focus lens,
   wherein the controller controls a movement of the zoom lens to control an image magnification and the controller controls the movement of the focus lens to control image focus.

28. The camera of claim 27, wherein
   the zoom lens has a plurality of magnification ranges,
   the zoom lens goes through the plurality of magnification ranges during the movement of the plurality of lens groups between a retracted position and the first predetermined position, and
   upon camera power up, the controller controls the movement of the plurality of lens groups between the retracted and the first predetermined positions.

29. The camera of claim 28, wherein the first predetermined position of the plurality of lens groups is one of a tele position and a wide position and the second predetermined position of the plurality of lens groups is the other of the tele position and the wide position.

30. The camera of claim 23, wherein the controller receives the instructions to record the image when a shutter button of the camera is fully depressed to start a photographing operation.

31. The camera of claim 23, wherein the first predetermined position is the position of the plurality of lens groups when the digital camera is turned off and the second predetermined position is the initialization position when the camera is turned on.

32. A method for controlling a camera, comprising:
   moving a plurality of lens groups from a first predetermined position to a second predetermined position;
   determining if an instruction to record an image by a shutter being pressed is received during the movement of the plurality of lens groups from the first predetermined position to the second predetermined position; and
   sensing the image prior to the plurality of lens groups have completed the movement to the second predetermined position and storing the image to a non-volatile memory accessible by the camera when it is determined that the instruction for photographing generated by the shutter being pressed is received.

33. The method of claim 32, wherein the first predetermined position of the plurality of lens groups is one of a tele position and a wide position and the second predetermined position of the plurality of lens groups is the other of the tele position and the wide position.

34. The method of claim 32, wherein further comprising maintaining a focus of the image during the movement of the plurality of lens group between the first and second predetermined positions.

35. The method of claim 32, further comprising displaying the image on a display during the movement of the plurality of lens group between the first and second predetermined positions.

36. The method of claim 32, wherein the plurality of lens groups include a zoom lens and a focus lens, the method further comprising:
   controlling a movement of the zoom lens to control an image magnification; and
   controlling the movement of the focus lens to control image focus.

37. The method of claim 36, wherein the zoom lens has a plurality of magnification ranges and the zoom lens goes through the plurality of magnification ranges during the movement of the plurality of lens groups between a retracted position and the first predetermined position, the method further comprising controlling the movement of the plurality of lens groups between the retracted and the first predetermined positions upon camera power up.

38. The method of claim 37, wherein the first predetermined position of the plurality of lens groups is one of a tele position and a wide position and the second predetermined position of the plurality of lens groups is the other of the tele position and the wide position.

39. The method of claim 32, wherein the receipt of the instructions to record the image occurs when a shutter button of the camera is fully depressed to start a photographing operation.

40. The method of claim 32, wherein the first predetermined position is the position of the plurality of lens groups when the digital camera is turned off and the second predetermined position is the initialization position when the camera is turned on.

* * * * *